United States Patent [19]

Christie et al.

[11] Patent Number: 5,062,093

[45] Date of Patent: Oct. 29, 1991

[54] OPTICAL DISK CARTRIDGE INSERTION APPARATUS FOR AN OPTICAL DISK STORAGE AND HANDLING SYSTEM

[75] Inventors: Leslie G. Christie, Greeley; Mark E. Wanger, Fort Collins; Daniel R. Dauner, Fort Collins; David P. Jones, Fort Collins, all of Colo.; Douglas R. Domel, Carlsbad, Calif.

[73] Assignee: Hewlett-Packard Company, Palo Alto, Calif.

[21] Appl. No.: 288,608

[22] Filed: Dec. 22, 1988

[51] Int. Cl.$^5$ .................. G11B 17/22; G11B 15/10
[52] U.S. Cl. .................. 369/36; 369/34; 369/77.2; 360/92
[58] Field of Search .................. 369/34, 35, 36, 37, 369/38, 77.1, 77.2, 75.1; 360/99.02, 99.06, 98.06

[56] References Cited

U.S. PATENT DOCUMENTS

| | | |
|---|---|---|
| 4,135,245 | 1/1979 | Kemplin et al. |
| 4,170,030 | 10/1979 | Castrodale et al. ............ 360/98 |
| 4,417,258 | 11/1983 | Tribolet et al. |
| 4,527,262 | 7/1985 | Manto . |
| 4,573,129 | 2/1986 | Tribolet et al. |
| 4,608,679 | 8/1986 | Rudy et al. ............ 369/36 |
| 4,614,474 | 9/1986 | Sudo ............ 369/36 X |
| 4,675,856 | 6/1987 | Rudy et al. ............ 369/36 |
| 4,685,095 | 8/1987 | Rudy et al. ............ 369/36 |
| 4,742,504 | 5/1988 | Takasuka et al. |
| 4,786,995 | 11/1988 | Stupeck et al. ............ 360/75 |
| 4,787,074 | 11/1988 | Deck et al. ............ 369/36 |
| 4,797,865 | 1/1989 | Imai et al. ............ 369/39 |
| 4,815,055 | 3/1989 | Fago, Jr. |
| 4,817,070 | 3/1989 | Hug et al. ............ 369/36 |
| 4,817,071 | 3/1989 | Carlson et al. ............ 360/99.06 X |
| 4,827,463 | 5/1989 | Motoyoshi et al. ............ 369/36 |
| 4,839,758 | 6/1989 | Honjoh ............ 360/99.06 |
| 4,853,916 | 8/1989 | Tomita ............ 369/36 |
| 4,879,615 | 11/1989 | Teranishi et al. ............ 369/34 |
| 4,912,575 | 3/1990 | Shiosaki ............ 360/71 |
| 4,918,548 | 4/1990 | O'Donnell et al. ............ 360/92 |

FOREIGN PATENT DOCUMENTS

| | | |
|---|---|---|
| 0067449 | 6/1982 | European Pat. Off. |
| 139327 | 5/1985 | European Pat. Off. |
| 288165 | 10/1988 | European Pat. Off. |
| 2594588 | 8/1987 | France . |
| 2610132 | 7/1988 | France . |
| 2449944 | 9/1989 | France . |
| 60-229268 | 4/1986 | Japan . |
| 60-256968 | 5/1986 | Japan . |
| 62-219364 | 3/1988 | Japan . |
| 1183243 | 3/1970 | United Kingdom . |
| 2106696 | 4/1983 | United Kingdom . |

Primary Examiner—Stuart S. Levy
Assistant Examiner—Kenneth B. Wells

[57] ABSTRACT

An optical disk cartridge insertion apparatus for an optical disk storage and handling system for use in association with an optical disk cartridge of the type having a rear end portion which is adapted to be inserted into an optical disk reading device and having a forward end portion which is adapted to be grasped by a human operator for handling the cartridge comprising a cartridge receiving assembly for receiving an optical disk cartridge in a predetermined orientation therewith, said cartridge receiving assembly being displaceable between a first relatively rotated operating position and a second relatively rotated operating position angularly displaced from said first operating position.

38 Claims, 6 Drawings Sheets

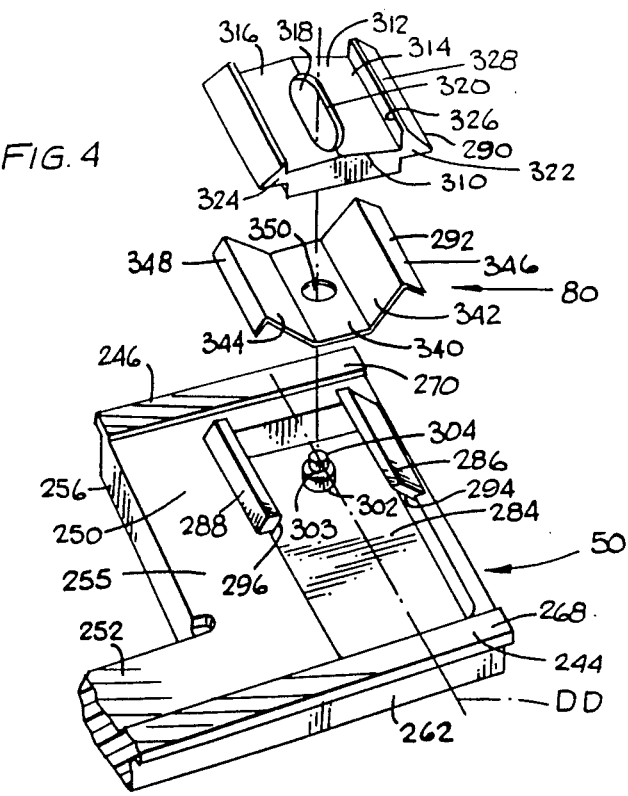
FIG. 4
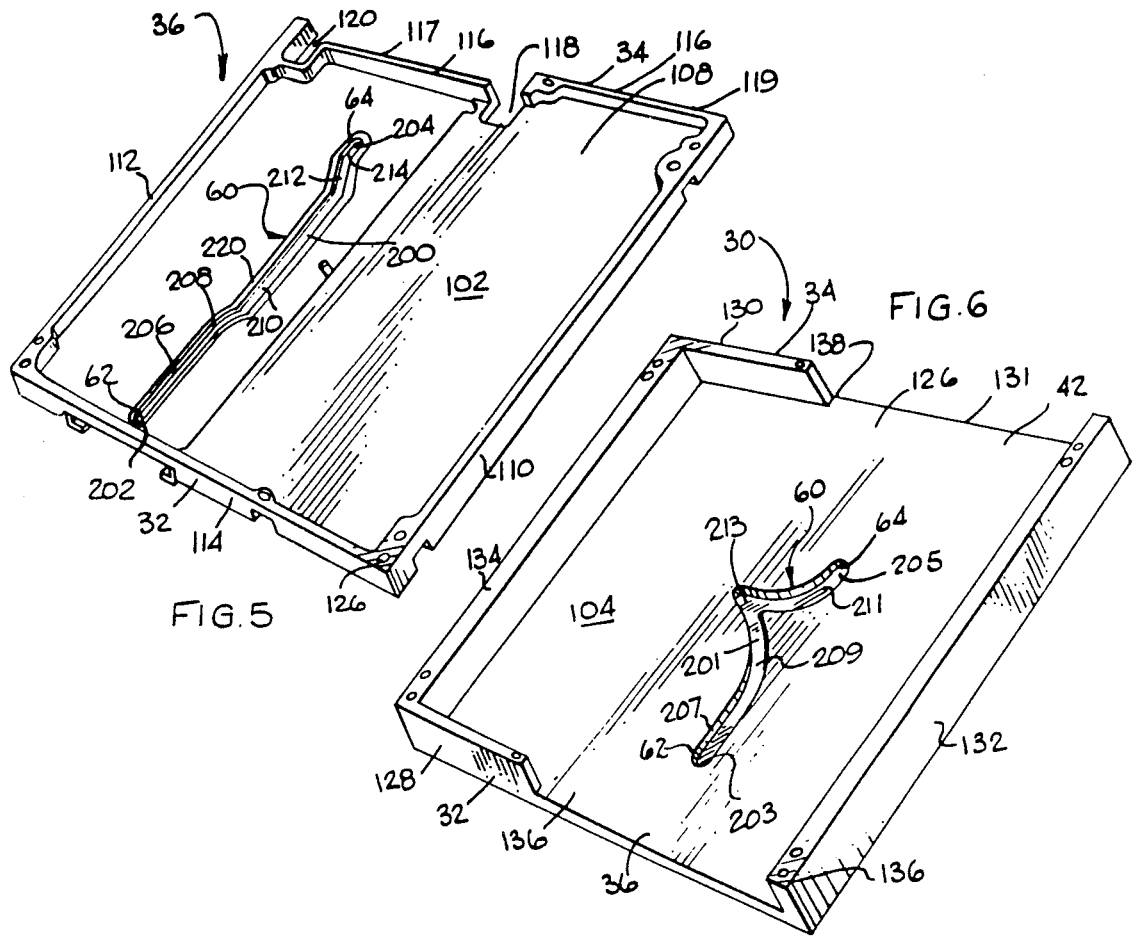
FIG. 5
FIG. 6

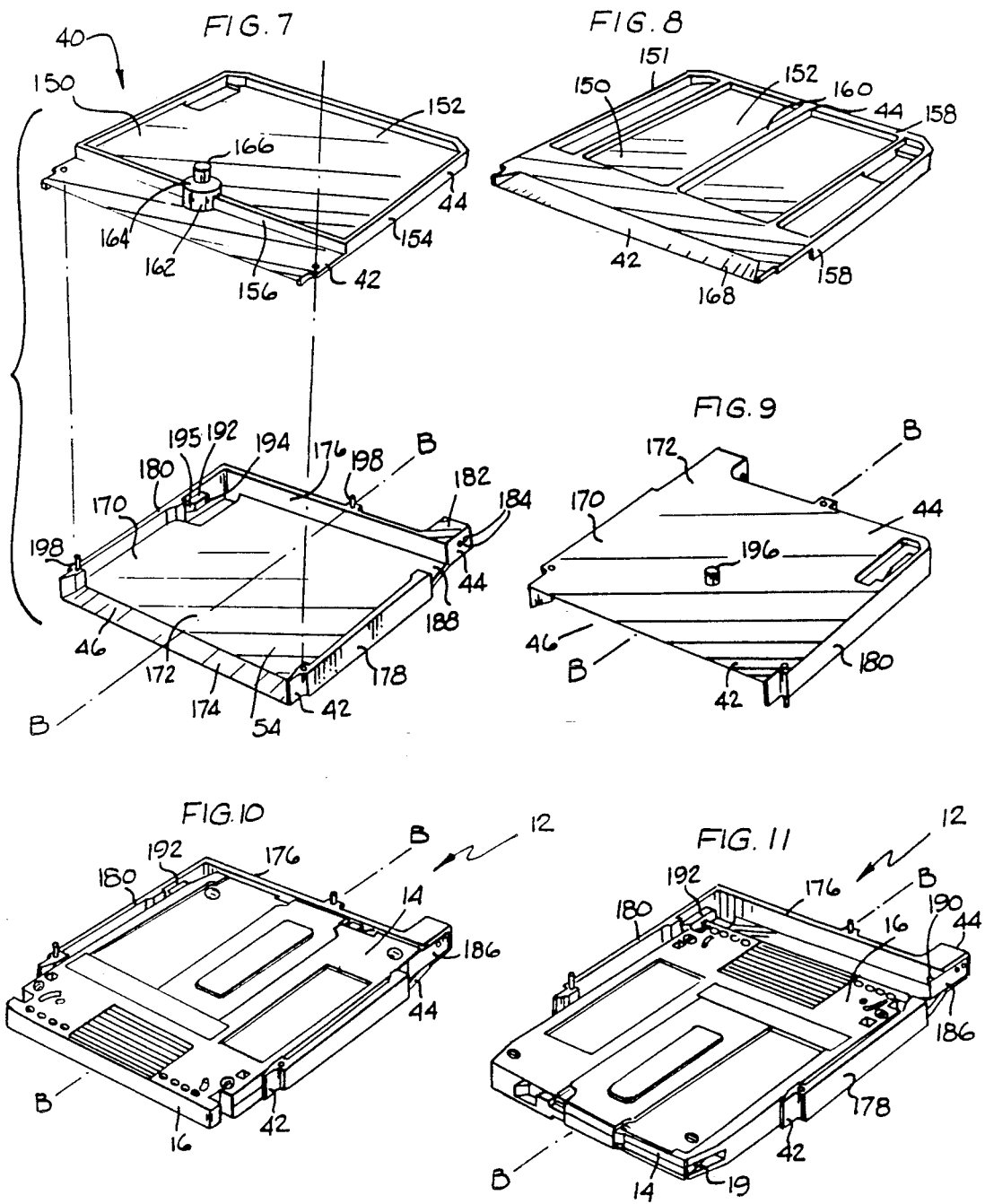

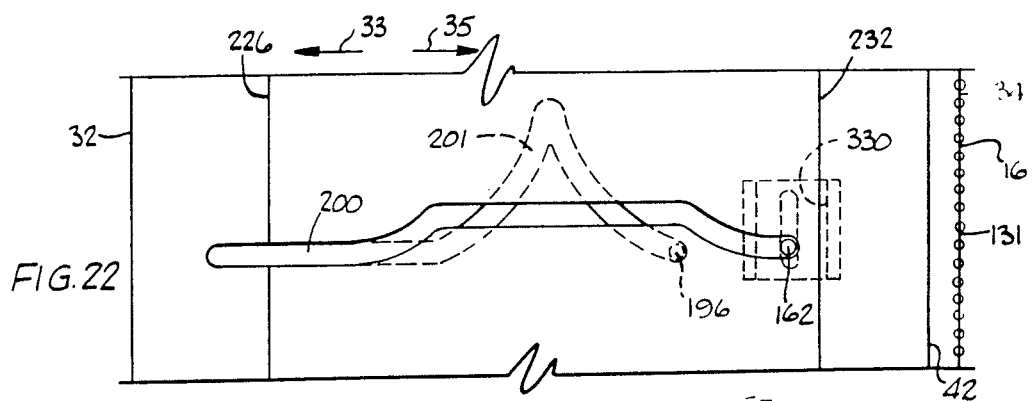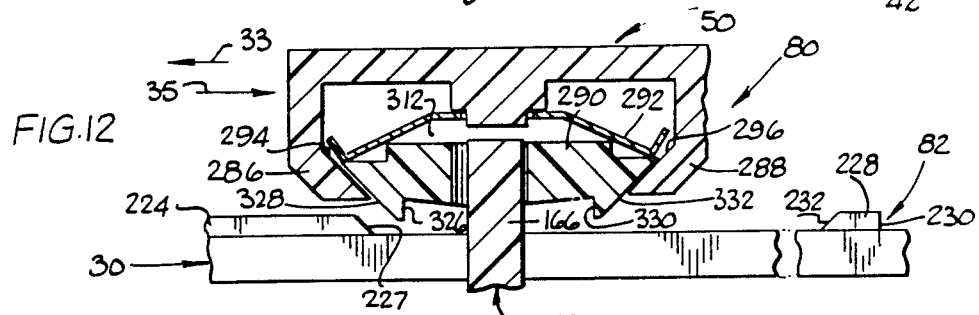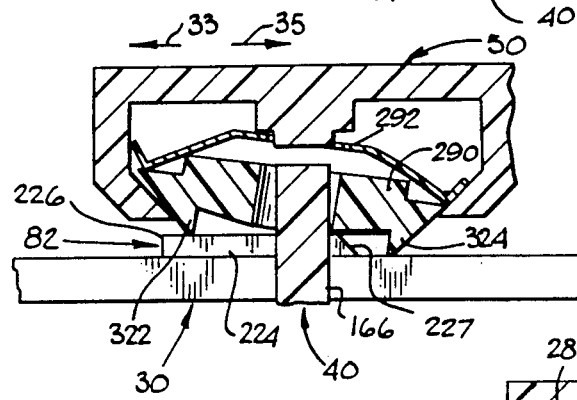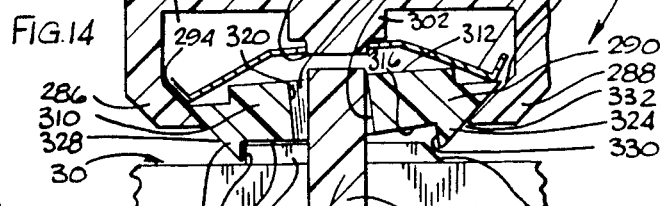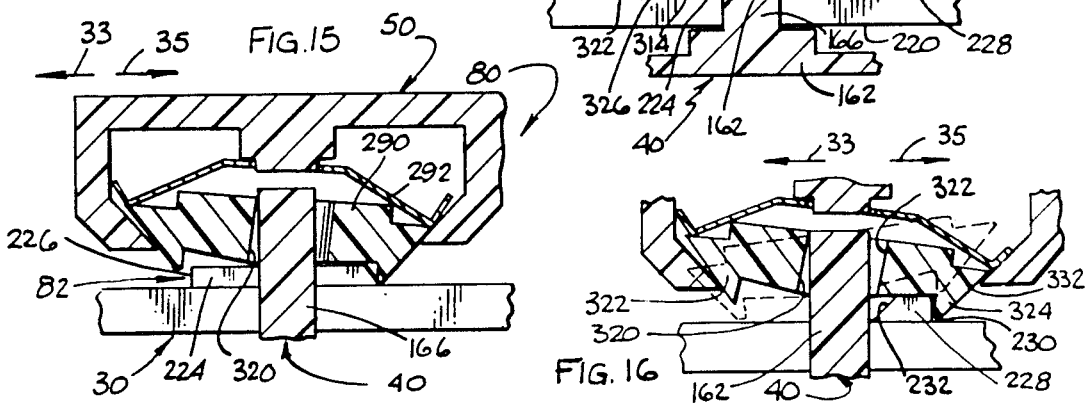

OPTICAL DISK CARTRIDGE INSERTION APPARATUS FOR AN OPTICAL DISK STORAGE AND HANDLING SYSTEM

BACKGROUND OF THE INVENTION

The present invention relates generally to an optical disk storage and handling system and, more particularly, to an optical disk insertion apparatus for use with an optical disk handling system.

An optical disk is a data storage medium which is readable by a laser-based reading device. Optical disks known as "compact disks" or "CDs" have become increasing popular during the past few years for recording music and audio-video works. Due to the huge storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be "erased" and "written" with new information, i.e. ROM disks are "read only" memory devices. However, recent technology has produced optical disks which are both computer readable and computer writable. Thus, in the future, optical disks are expected to become increasingly more important in the computer industry and may eventually replace magnetically readable and writable storage media such as "floppy disks" and "hard disks." Another recent development, the ability to provide data storage on both surfaces of an optical disk, has effectively doubled the optical disk storage capacity.

Optical disks of the type used in computer applications are mounted in a generally parallelepiped-shaped cartridge. Such a cartridge has a forward end which is generally provided with a ribbed surface portion which is adapted to be grasped between the thumb and index finger of an operator for handling the cartridge. The cartridge is adapted to be readably mounted in a conventional optical disk reader by grasping its forward end and inserting the cartridge, rear-end-first, through a narrow slot provided on the front face of a disk reader.

Currently, most optical disks are hand-inserted into disk readers. However, for large databases consisting of many optical disks, it is preferable, and perhaps essential, to provide an optical disk storage system for storing the disks at known locations, and an optical disk handling system which is capable of retrieving a desired disk from a storage location and inserting the disk in an optical disk reader. In a disk storage system wherein stored disks and an associated disk reader are positioned in longitudinally extending storage locations arranged in a two-dimensional array consisting of vertically extending columns and horizontally extending rows, it will generally be necessary for a disk handling system to engage and move each disk longitudinally, vertically, laterally, and, again, longitudinally in order to remove it from storage, move it into aligned relationship with a disk reader, and insert it into a disk reader. It may also be necessary for the disk handling system to flip the disk to reverse the side thereof which will be positioned in readable relationship with a reader.

In order to decrease the cost and increase the reliability of such a disk handling system, it is generally desirable to reduce the number of separate drive units to a minimum. It is also desirable to minimize or eliminate the type of mechanical systems such as, for example, clutch assemblies, which are particularly subject to malfunction under frequent use conditions.

An optical disk handling apparatus which is adapted to engage and longitudinally displace and/or flip optical disk cartridges for inserting and removing the cartridges from various storage locations of an optical disk storage system is described in U.S. patent application Ser. No. 278,102 filed 11/30/88 of Methlie, Oliver, Stavely, and Wanger, which is hereby specifically incorporated by reference for all that is disclosed therein. A problem is encountered when loading cartridges into an optical disk handling an storage system which uses a handling apparatus such as disclosed in the Methlie et al. patent application referred to above. The problem is that in order for a cartridge to be positioned in proper relationship for engagement by the handling apparatus, it must be presented with its forward end located adjacent to an engagement portion of the handling apparatus. In order to achieve such an orientation, it would appear necessary to pass each cartridge through a system housing in an orientation opposite to the orientation of the cartridge when it is inserted into a disk reader. In other words, it would seem that the cartridge must be passed through the housing forward-end-first rather than rear-end-first. The problem with inserting a cartridge into a housing forward-end-first is that it is unnatural and annoying for most operators. Further, damage to cartridges and/or jamming of the handling system may occur if cartridges are inserted in the wrong orientation.

Thus, it would be generally desirable to provide an apparatus which overcomes these problems associated with loading an optical disk cartridge into an optical disk cartridge handling and storage system. Ideally, such an apparatus should be operable without adding further drive units or complex clutch assemblies, etc., to the optical disk storage and handling system.

SUMMARY OF THE INVENTION

The present invention is directed to an optical disk cartridge insertion apparatus which is adapted to be used in an optical disk storage and handling system. The apparatus is designed to be used in association with a conventional optical disk cartridge which has a rear end portion adapted to be inserted into an optical disk reading device and a forward end portion adapted to ordinarily be grasped by a human operator for handling the cartridge. The cartridge insertion apparatus enables a human operator to grasp and insert an optical disk cartridge into a forward end of the insertion apparatus in the same manner in which a cartridge is ordinarily inserted into an optical disk reading device. The insertion apparatus reorients the hand-inserted cartridge to enable a mechanized handling device positioned at a rear end of the insertion apparatus to engage the forward end portion of the optical disk cartridge. The handling device may thereafter remove the cartridge from the insertion apparatus and insert it into a selected storage location or into an optical disk reading device which is associated with the storage and handling system. The reorientation performed by the insertion apparatus enables the handling device to perform its cartridge transporting function without angularly reorienting the cartridge prior to inserting it into a storage location or reading device. When a cartridge is to be removed from the storage and handling system, the insertion apparatus performs the above described function in reverse, i.e. i receives a cartridge from the mechanized handling device, reorients it, and presents it forward-end-first for removal by a human operator. The sources of power for operating the insertion apparatus are the human operator and the mechanized handling device.

The insertion apparatus may comprise a housing having a forward end portion, a rear end portion, and a housing longitudinal axis extending therebetween. The housing has a forward opening which is adapted for enabling hand-insertion and hand-removal of optical disk cartridges by a human operator. The housing has a rear opening for enabling machine-insertion and machine-removal of cartridges by a mechanized cartridge handling device.

The insertion apparatus may also comprises a cartridge receiving assembly which is supported by the housing in angularly and longitudinally displaceable relationship with the housing. The cartridge receiving assembly has a first operating position in which is it located during hand-insertion and hand-removal of cartridges wherein the forward end portion of the receiving assembly is positioned proximal the forward end portion of the housing. The receiving assembly has a second operating position in which it is located during machine-insertion and machine-removal of cartridges. In the second operating position, the forward end portion of the receiving assembly is positioned proximal the rear end portion of the housing.

The insertion apparatus may further comprise an actuator which is operably connected to the cartridge receiving assembly for moving the cartridge receiving assembly between the first operating position and the second operating position.

The apparatus also includes a track having a forward end portion and a rear end portion. The track is fixedly associated with the housing and is operably associated with the cartridge receiving assembly for guiding the movement of the receiving assembly relative the housing.

An actuator guide is provided for limiting the movement of the actuator relative to the housing to an actuator path having a central longitudinal axis extending parallel to the housing longitudinal axis.

The apparatus also comprises latching assembly operably associated with the actuator and the track for releasably maintaining the receiving assembly in a first latching location associated with hand-insertion and hand-removal of cartridges and a second latching location associated with machine-removal and machine-insertion of cartridges.

BRIEF DESCRIPTION OF THE DRAWINGS

FIG. 4 is a detail exploded perspective view of an actuator and latch assembly.

FIG. 5 is a bottom perspective view of an upper housing member.

FIG. 6 is a top perspective view of a lower housing member.

FIG. 7 is an exploded top perspective view of an optical disk receiving assembly.

FIG. 8 is a bottom perspective view of a receiving assembly upper member.

FIG. 9 is a bottom perspective view of a receiving assembly lower member.

FIG. 10 is a top perspective view of a receiving assembly lower member with a cartridge properly inserted therein.

FIG. 11 is a top perspective view of a receiving assembly lower member with a cartridge improperly inserted therein.

FIGS. 12-16 are detail, partially cross-sectional, elevation views of a latch assembly and associated catch surfaces in various operating states.

FIGS. 17-22 are schematic top plan views of the insertion apparatus illustrating the location of various components thereof during an operating cycle.

DETAILED DESCRIPTION OF THE PREFERRED EMBODIMENT OF THE INVENTION

In General

Figure 1:
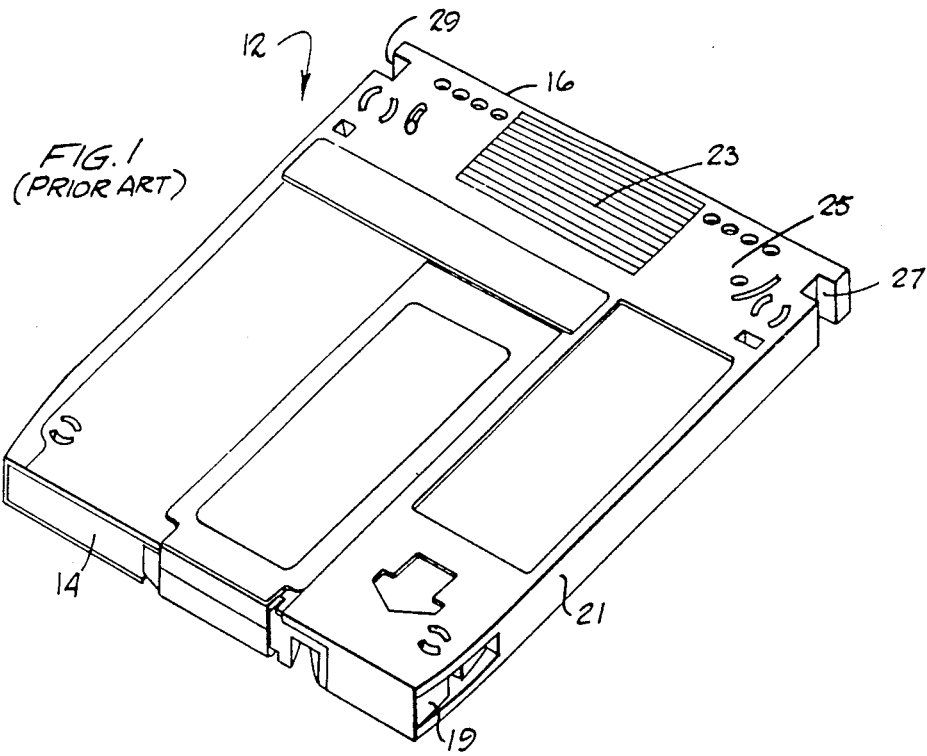
FIG. 1 is a perspective view of a conventional optical disk cartridge
Figure 2:
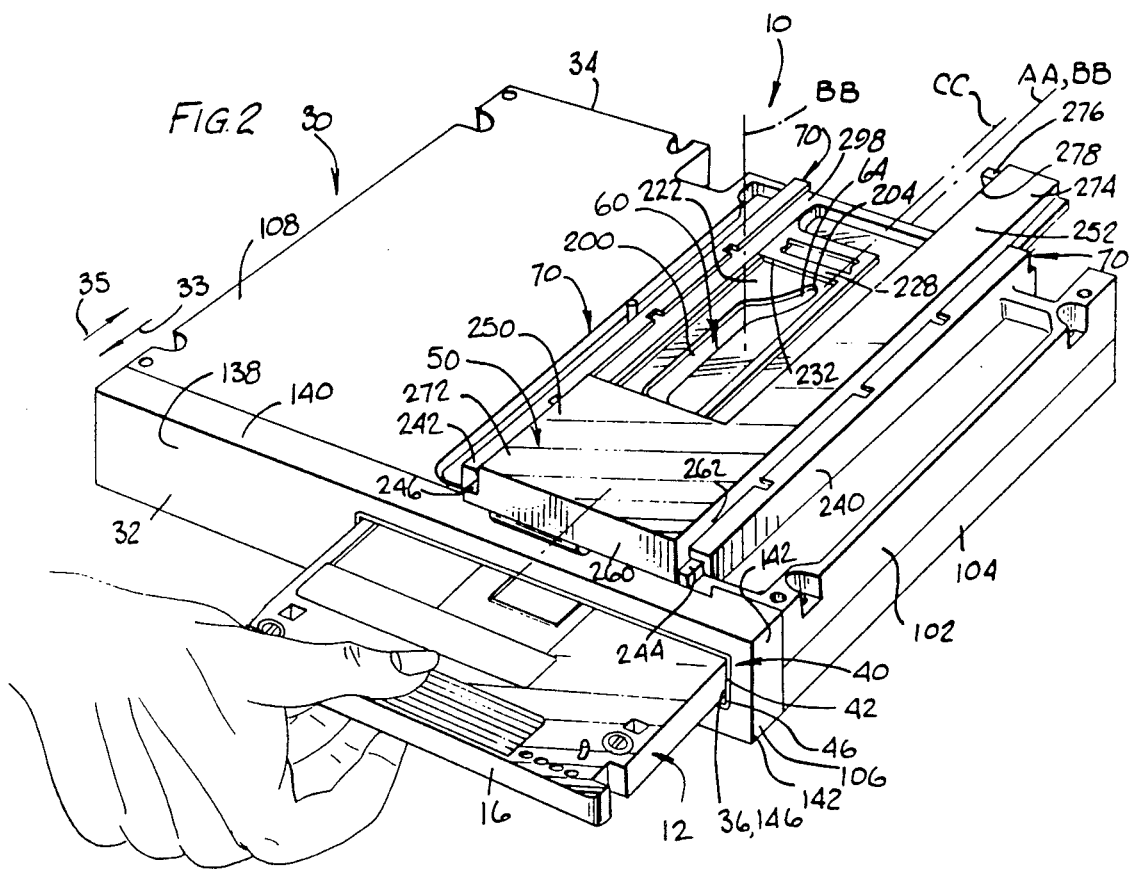
FIG. 2 is front perspective view of an optical disk insertion apparatus.
Figure 3:
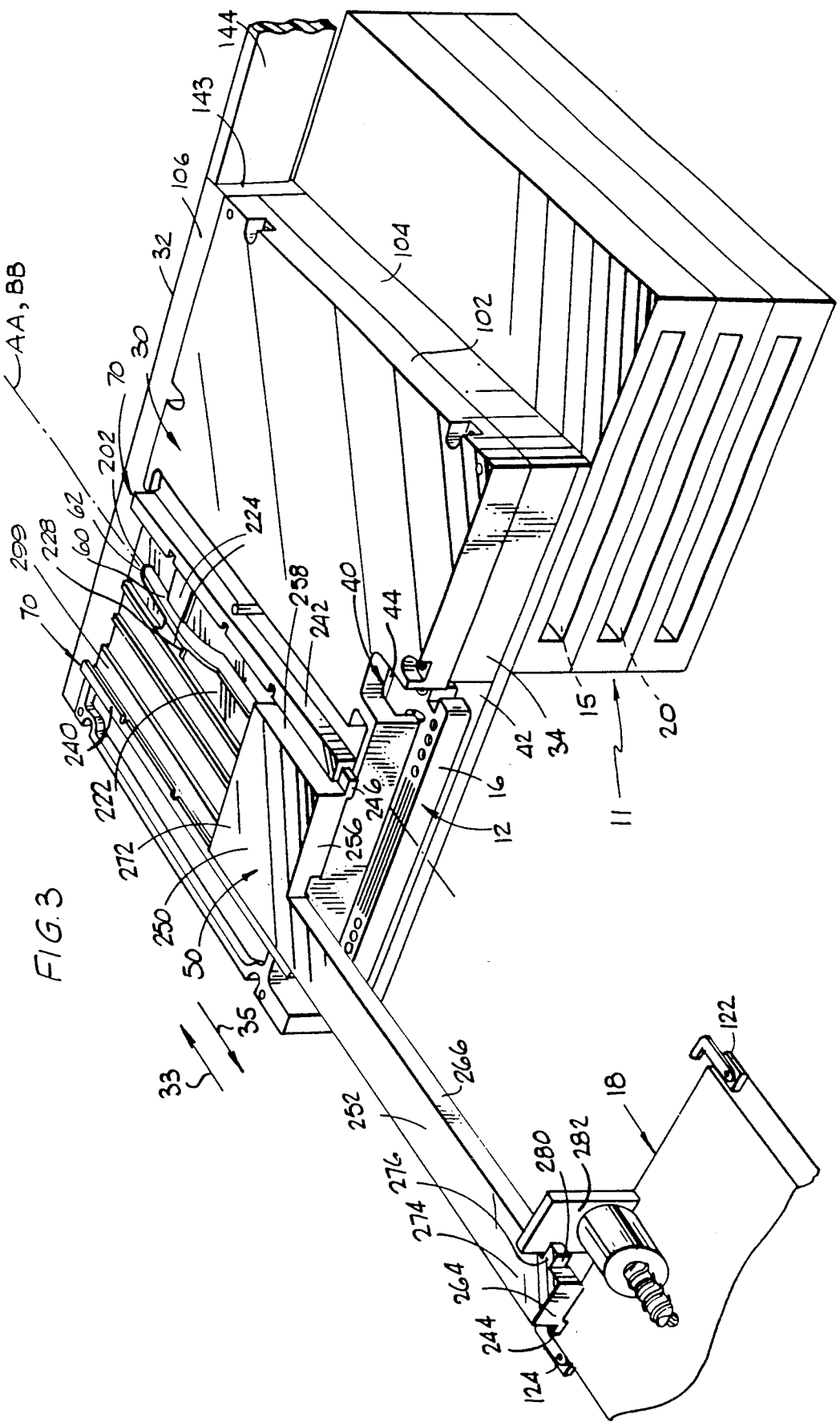
FIG. 3 is rear perspective view of an optical disk insertion apparatus and portions of an associated optical disk storage and handling system.

FIGS. 2 and 3 illustrate an optical disk cartridge insertion apparatus 10 which is adapted to be used in an optical disk storage and handling system 11. The apparatus 10 is designed to be used in association with a conventional optical disk cartridge 12, FIG. 1. Cartridge 12 has a rear end portion 14 which is adapted to be inserted into an optical disk reading device 15 and has a forward end portion 16 which is adapted to ordinarily be grasped by a human operator for inserting and removing the cartridge from an optical disk reading device. The cartridge insertion apparatus 10 enables a human operator to grasp and insert an optical disk cartridge 12 into a forward end 32 of the insertion apparatus in the same manner in which a cartridge is ordinarily inserted into an optical disk reading device. The insertion apparatus 10 angularly reorients the hand-inserted cartridge to enable a mechanized handling device 18 positionable at a rear end 34 of the insertion apparatus to engage the forward end portion 16 of the optical disk cartridge. The handling device may thereafter remove the cartridge from the insertion apparatus 10 and insert it into a selected storage location 20 or into an optical disk reading device 15 associated with the storage and handling system without angularly reorienting the cartridge. When a cartridge is to be removed from the storage and handling system, the insertion apparatus 10 performs the above described function in reverse, i.e. it receives a cartridge at its rear end 34 from the mechanized handling device 18, reorients it, and presents it forward-end-first for removal by a human operator at its forward end 32. The only sources of power required for operating the insertion apparatus are the human operator and the mechanized handling apparatus 18.

The insertion apparatus 10 comprises a housing means 30 having a forward end portion 32, a rear end portion 34, and a housing longitudinal axis AA extending therebetween. The housing has a forward opening 36 which is adapted for enabling hand-insertion and hand-removal of optical disk cartridges 12 by a human operator. The housing means has a rear opening 42 for enabling machine-insertion and machine-removal of cartridges by a mechanized cartridge handling device 18. The housing means forward and rear end portions 32, 34 define forward and rear movement directions 33, 35.

The insertion apparatus 10 also comprises a cartridge receiving means 40, FIGS. 7-11, which is supported by the housing means 30 in angularly and longitudinally displaceable relationship with the housing means. The cartridge receiving means is adapted for receiving a cartridge 12 therein and for holding the cartridge in stationary relationship therewith, FIG. 10. The cartridge receiving means has a central longitudinal axis BB extending between a forward end portion 42 and a rear end portion 44 thereof which is positionable in coaxial relationship with housing longitudinal axis AA. As illustrated in FIG. 10, the cartridge receiving means 40 is adapted to have the forward end portion 16 of the cartridge 12 positioned proximate its forward end portion 42 and to have the rear end portion 14 of the cartridge positioned proximate its rear end portion 44 when a cartridge is properly received therein The receiving means has a forward end opening 46 which is adapted to enable insertion and removal of cartridges 12. The cartridge receiving means has a first operating position, FIGS. 2 and 17, in which is it located during hand-insertion and hand-removal of cartridges wherein the forward end portion 42 of the receiving means is positioned proximal the forward end portion 32 of the housing means 30. The receiving means has a second operating position, FIGS. 3 and 22, in which it is located during machine-insertion and machine-removal of cartridges. In the second operating position, the forward end portion 42 of the receiving means is positioned proximal the rear end portion 34 of the housing means. In the illustrated embodiment, the receiving means second operating position is rotated 180° from the first operating position.

Figure 17:
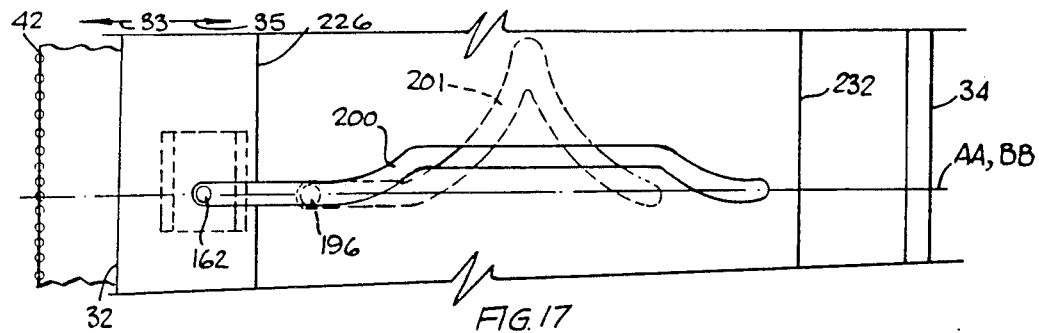

The insertion apparatus 10 further comprises an actuator means 50 which is operably connected to the cartridge receiving means 40 for moving the cartridge receiving means between the first operating position, FIG. 17, and the second operating position, FIG. 22, thereof.

The apparatus 10 also includes a track means 60 having a forward end portion 62 and a rear end portion 64, FIGS. 5 and 6. The track means is fixedly associated with the housing means 30 and is operably associated with the cartridge receiving means 40 for guiding the movement of the receiving means 40 relative the housing means 30.

An actuator guide means 70 is provided for limiting the movement of the actuator means 50 relative to the housing means 30 to an actuator path having a central longitudinal axis CC extending parallel to the housing means longitudinal axis AA.

Figure 18:
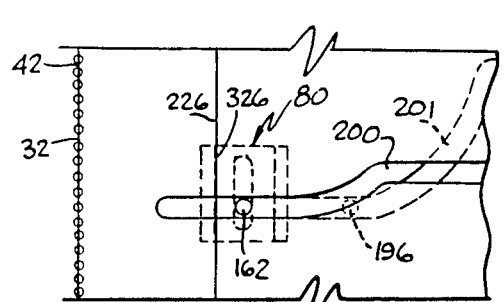

The apparatus also comprises latching assembly means 80, 82, FIGS. 4 and 12-16, operably associated with the actuator means 50 and the track means 60 for releasably maintaining the receiving means 40 in a first latching location, FIGS. 14 and 18, associated with hand-insertion of cartridges and a second latching location, FIGS. 16 and 22, associated with machine-removal and machine-insertion of cartridges.

Having thus described the insertion apparatus 10 in general, various features of the apparatus will now be described in further detail.

Optical Disk Cartridge

A conventional optical disk cartridge is illustrated in FIG. 1. The optical disk cartridge has a rear end portion 14 which is adapted to be inserted into an optical disk reading device and a forward end portion 16 which is adapted to be grasped by a human operator for handling the cartridge. Conventional optical disk cartridges in use in the United States for computer applications have a generally parallelepiped shape with a thickness (height) of approximately 0.4 inches, a length of approximately 6 inches, and a maximum width of approximately 5.3 inches. The rear end portion 14 of an optical disk cartridge tapers in width somewhat in approximately the last 0.5 inch of axial length thereof from a maximum lateral dimension of 5.3 inches to a minimum lateral dimension of approximately 5.1 inches at the terminal end thereof. Each optical disk has symmetrically positioned recesses 19 (only one shown) in the lateral sidewalls 21 (only one shown) thereof which are adapted for engaging a portion of a reading device. The forward end of a conventional optical disk cartridge has a centrally positioned ribbed surface 23 (only one shown) on both a top 25 and bottom surface (not shown) thereof. Each optical disk also comprises a first rectangular groove 27 and a second rectangular groove 29 in a forward portion of the lateral sidewalls which are adapted to be engaged by portions of conventional reading devices for locating and holding the cartridge in the reading device.

Housing Means

Housing means 30 may comprise an upper housing member 102, a lower housing member 104, and a front housing member 106. The upper housing member 102 has a top panel portion 108, first and second lateral sidewalls 110, 112, a front wall 114, and a rear wall 116. FIG. 5. The rear wall has a forward portion 117 and a rear portion 119 which may be positioned 0.43 inches rearwardly of portion 117. The top panel has forwardly extending recesses 118, 120, in the rear wall portion 117 which are adapted to accommodate cartridge engaging finger portions 122, 124 of mechanized cartridge handling device 18. The peripheral walls 110, 112, 114, 116 may comprise vertically extending bores 126 which are adapted to receive screws for attaching the upper housing member 102 to the lower housing member 104. The upper housing member 102 has a groove 200 therein, as described in further detail below, which provides a portion of the track means 60.

The lower housing member 104, as best illustrated in FIG. 6, comprises a bottom panel 126, a front wall 128 a rear wall 130, and first and second lateral sidewalls 132, 134. The front wall 128 comprises a laterally extending opening 136 therein which may have a lateral dimension of, e.g. 6.02 inches. The rear wall 130 comprises a rear opening 138 therein, positioned in longitudinal alignment with the forward opening 136, which may be, e.g., 6.30 inches wide Lower panel 126 has a recessed groove 201 therein which forms a portion of the track means 60, as described in further detail below The peripheral sidewalls 128, 130, 132, 134 of the lower housing member may comprise bores 136 therein adapted to threadingly accept screws or the like for attaching the upper housing member 102 to the lower housing member 1 04. The upper and lower housing members, when attached, define a generally parallelpiped-shaped cavity which may have a lateral dimension of 12.18 inches, longitudinal dimension of 8.68 inches, and a height of 2.18 inches.

As best illustrated in FIG. 2, the front housing member 106 comprises a generally parallelepiped-shaped member having a front surface 138, a rear surface (not shown), a top surface 140, first lateral side surface 142 and a second lateral side surface 143, FIG. 3. The front housing member 106 provides a cosmetic panel for the apparatus which is adapted to be positioned with its front surface 138 in parallel alignment with the front surface of a forward housing wall 144 of the associated storage and handling system 11, FIG. 3. In one preferred embodiment, the handling system housing 144 encloses the insertion apparatus 10, the mechanized handling device 18, the disk reader 15, and the various disk storage locations 20, etc., therein. The front member has a height equal to the combined heights of the upper and lower housing members 102, 104, e.g. 1.57 inches. The front member has an opening 146 extending therethrough which is identical in shape to the opening 136 in the lower member forward wall and which is adapted to be positioned opposite thereto This opening may be 6.02 inches by 0.72 inches The front member 138 may be secured to the front surfaces of the upper and lower members 102, 104 by conventional attachment means such as adhesive, screws or the like. The members 102, 104, 106 may be constructed from a durable, high-strength plastic such as polycarbonate with 10% fiberglass and 10% PTFE fillers.

Cartridge Receiving Means

As illustrated in FIG. 7, the cartridge receiving means comprises an upper member 150 and a lower member 17 which are adapted to be attached to one another to define a cartridge receiving cavity 154. The upper member 150 comprises a generally flat, horizontal panel 152 with a plurality of upstanding rib portions 154, 156, etc., and a plurality of downwardly extending rib portions 158, 160, etc., which are adapted to strengthen the central panel 152. The upper member 150 also comprises an upstanding stud member 162 having an upper circular surface 16 which is adapted to ride on a portion of track means 60, as described in further detail below. The stud member 162, in turn, has a post member 166 centrally mounted thereon and extending upwardly therefrom which is adapted to extend through a groove 200 in the upper housing member and which is also adapted to extend through an opening 318 in latch means 80, as described in further detail hereinafter. Stud 162 may have a diameter of 0.49 inches and an axial length of 0.39 inches. Post 166 may have a diameter of 0.24 inches and an axial length of 0.32 inches. Stud 162 and post 166 are laterally centrally positioned on the top member 152 and are located at a longitudinal distance 1.15 inches rearwardly of the forward edge portion of member 152 The upper member has a tapering forward edge surface 168 which is adapted to facilitate the insertion of cartridges into the cartridge receiving means 40. The receiving means lower member 170 has a flat, generally rectangularly-shaped bottom panel 172 having a tapered forward edge surface 174 which is adapted to be positioned immediately below upper member tapered surface 168. The lower member has an upstanding rear wall 176 and two upstanding lateral sidewalls 178, 180. Rear wall 176 has a mounting block 182 integrally formed therewith which may have a pair of screw holes 184 therein which are adapted to accept screws for enabling the attachment of a leaf spring 186, FIGS. 10 and 11, thereto. The leaf spring 186 projects into a cutout portion 188 in sidewall 178 and has a laterally projecting portion 190, FIG. 11, thereon which is adapted to engage the rear sidewall recess 19 of an optical disk 12 which is received in the receiving means 40. The maximum spacing between the two sidewalls 178, 180, which may be, e.g., 5.33 inches, allows a cartridge 12 to be received in close-fitting, sliding relationship therebetween. A laterally outwardly projecting beveled portion 192 comprises an outer surface 194 which is positioned sufficiently close to wall 180 to allow a cartridge to be urged into engagement with rear wall 176 when the cartridge is positioned within the receiving means (tapered) rear-end-first. However, the surface 194 is positioned sufficiently far away from wall 180, e.g. 0.10 inches away, so as to prevent the cartridge 12 from moving past beveled portion 192 if the cartridge is inserted improperly, i.e. (untapered) forward-end-first, into the receiving means, see FIG. 11. The forwardmost edge 195 of portion 192 may be located, e.g., 0.88 inches forwardly of rear wall 176.

The lower member 170 has a lower stud 196, FIG. 9, projecting from the bottom thereof The stud 196 may have a diameter of 0.24 and an axial length of 0.15 and may be centrally laterally located on the lower member 170 at a longitudinal distance of 2.33 inches from the forward edge of the lower member. Stud 196 is adapted to be received in groove 201 in the lower housing member, as described in further detail hereinafter.

The upper member 150 is adapted to be attached to the lower member 170 as by post members 198, FIG. 7, or other conventional attachment means. In one preferred embodiment, the upper and lower members of the receiving means are constructed from material identical to that from which the housing means is constructed.

Track Means and Catch Means

As best illustrated in FIGS. 2, 3 and 5, the upper housing member 102 top panel 108 has a generally longitudinally extending groove 200 which extends vertically entirely through the upper member 102. The groove 200 has a constant width, e.g. 0.25 inches, and is adapted to receive the receiving means top post member 166 therethrough. The groove 200 has a forward end 202 and a rear end 204. The forward end 202 is laterally centered with respect to openings 136, 138 in the housing and is positioned approximately 0.31 inches rearwardly of the forwardmost edge of upper housing member 102. The rear end 204 is also laterally centered with respect to housing openings 136, 138 and is located 1.95 inches forwardly of an oppositely positioned portion of the rear edge of member 102. The groove 200 comprises a first straight portion 206 which is positioned parallel housing axis AA. The groove 200 comprises an arcuate second portion 208 which begins approximately 1.63 inches rearwardly of the groove forward end 202 and which has a radius of 1.58 inches. The groove has a straight third portion 210 beginning approximately 2.39 inches rearwardly of front end point 202 and which extends parallel to groove portion 206. The centerline of groove 206 may be positioned 0.39 inches laterally from the centerline of groove portion 210. Groove 200 comprises an arcuate fourth portion 212 having a radius of 1.58 inches which begins 5.34 inches rearwardly of point 202. Groove 200 has a straight fifth portion 214 which extends from a point approximately 6.09 inches rearwardly of point 202 to rear end point 204. Portion 214 is aligned with portion 206. As illustrated in FIG. 5, a recess 220 is provided in the rear housing wall which circumscribes groove 200 and which extends approximately 0.25 inches laterally outwardly from the outermost edges of the groove. The recess 220 may be approximately 0.040 inches deep and is adapted to closely slidingly receive the receiving means stud member 162 therewithin, FIGS. 5 and 14.

As best illustrated in FIGS. 2 and 3, the groove 200 also lies within a recessed portion 222 provided on the upper surface of upper housing member 102. The upper recess 222 is a generally rectangularly shaped recess extending from the forward end 202 to the rear end 204 of the groove. A raised portion 224 which is intersected by the groove 200 is provided within this upper recess 222 and may provide a portion of the catch means 82. A forward edge 226 of this raised portion 224 provides a forward catch surface, FIG. 13. The raised portion 224 is provided with a tapered rear edge 228 which is adapted to prevent engagement of latch means 80 therewith. Immediately to the rear of the rearmost point 204 of groove 200 is a second raised portion 228, which may provide a portion of catch means 82. Raised portion 228 has a rear edge 230 which provides a rear catch surface, FIGS. 12 and 16. Second raised surface 228 has a forward tapered surface 232 which is adapted to prevent engagement of latch means 80 therewith. The longitudinal dimension of forward raised portion 224 may be, e.g., 1.12 inches, and the forward edge 226 thereof may be positioned, e.g., 0.64 inches rearwardly of the forward end 202 of groove 200. Rear raised portion 228 may have a longitudinal dimension of 0.35 inches. The rear edge 230 thereof may be positioned approximately 0.25 inches from groove 200 rear end point 204. The forward and rear catch surfaces 226, 230 may each comprise a lateral dimension of 5.99 inches and may each have a height of 0.079 inches.

As illustrated in FIG. 6, the lower housing member 104 has a groove 201 therein which comprises a portion of the track means 60. Lower groove 201 has a forward end 203 and a rear end 205. Both ends 201, 205 are laterally centered relative openings 136 and 138. End 203 is positioned 1.48 inches rearwardly of the forward edge of member 104. Groove end 205 is positioned 3.13 inches forwardly of the rear edge of member 104. Groove 201 comprises a straight first portion 207 which extends parallel to axis AA. Groove 201 has an arcuate second portion 209 which begins 1.35 inches rearwardly of forward end point 203 and which has a radius of 1.98 inches. Groove 201 has an arcuate third portion 211 which begins 2.63 inches rearwardly of point 203 and which terminates at point 205. Portions 209 and 211 intersect to form a generally V-shaped configuration having an apex 213 which is positioned approximately 1.57 inches laterally of a line defined by front and rear end points 203, 205. Groove 213 may have a depth of, e.g., 0.16 inches which is less than the total thickness of member 104 which may be, e.g., 0.24 inches. Groove 201 has a constant width of, e.g., 0.25 inches and is adapted to receive receiving means lower stud member 196 in close sliding relationship therewith. The relative position of the upper groove 200 with respect to the lower groove 201 is shown in FIGS. 17–22.

Actuator Guide Means

As best illustrated in FIGS. 2 and 3, actuator guide means 70 may be integrally formed with the top surface of housing upper member 102 The actuator guide means may comprise a first and second inverted-L-shaped longitudinally extending members 240, 242 which are adapted to longitudinally slidingly receive actuator follower portions 244, 246 therewithin for guiding the actuator means 50 along a longitudinally extending path. The guide members 240, 242 may be integrally formed with the top housing member 102.

Actuator Means

As best illustrated in FIGS. 2–4, the actuator means 50 may comprise a generally pan-shaped member having a rectangular central body portion 250 and a longitudinally extending leg portion 252. The actuator means has a top surface portion 254, a bottom surface portion 255 and a plurality of generally vertically extending lateral side surfaces 256, 258, 260, 264, 266. Actuator follower members 244, 246 extend laterally outwardly, e.g. 0.17 inches, from lateral side surfaces 258 and 262, respectively. The follower members 244, 246 also extend a small distance downwardly, e.g. 0.039 inches, beyond bottom surface 250 and provide raised surfaces 268, 270 which make sliding contact with the upper surface of the housing means 30. The actuator means comprises a forward end 272 and a rear end 274. A nub member 276 having a forward surface 278 and a rear surface 280 projects laterally outwardly from lateral side surface 266 a distance of, e.g., 0.31 inches. The nub member 276 is adapted to engage a vertically and longitudinally movable portion 282 of a mechanized handling apparatus 18. The mechanized handling apparatus may be constructed and arranged such that portion 282 thereof may be moved into abutting contact with nub forward surface 278 for moving the actuator rearwardly. The actuator portion 282 may also be moved into abutting contact with stud rear surface 280 for moving the actuator forwardly. The actuator means central body 250 may have a lateral dimension, exclusive of the follower members 244, 246, of 2.95 inches and may comprise an axial length of 10.18 inches. The leg portion 252 may comprise a length extending rearwardly from the central body portion 250 of 7.71 inches and may comprise a lateral dimension exclusive of follower member 244 of 0.87 inches. The actuator may have a height of 0.41 inches.

As best illustrated in FIG. 4, the actuator central body 250 may have a generally rectangularly-shaped recess 284 in the lower portion thereof having a depth of 0.36 inches, a dimension extending longitudinally of the actuator means of 1.24 inches, and a dimension extending laterally of the actuator means of 1.02 inches. Downwardly and inwardly projecting flange portions 286, 288, which are also illustrated in FIGS. 12–16, are positioned at the forward and rear edges of the recess 284 and are adapted to capture a latch member 290 and biasing member 292 within a portion of recess 284. Each of the flange members 286, 288 has a generally downwardly and inwardly extending surface portion 294, 296 which is adapted to abuttingly slidingly engage corresponding surfaces of the latch member. The flange portions 286, 288 have a downwardly extending dimension which is sufficiently small to enable the flanges to ride above the upper surface of the upper recess 222 in the housing means upper member 102 while the actuator follower portions 244, 246 ride on relatively raised surface portions 298, 299 of the housing means, FIGS. 2 and 3. The flange portion 286, 288 may extend, e.g., 0.060 inches downwardly from the bottom surface of actuator means central body portion 250.

The actuator means may also include a latch attachment means which includes a stud 302 which may have an axial length of, e.g., 0.10 inches and a diameter of 0.44 inches and a post 304 which may have an axial length of 0.080 inches and a diameter of 0.24 inches. The stud and post may be integrally formed with the central body portion 250 and are centrally positioned with respect to the flange portions 286, 288.

Latch Means

As best illustrated in FIGS. 4 and 14, latch means 80 may comprise a latching member 290 and a biasing member 292. The latching member may comprise a central body portion 310 having a generally planar top surface 312 and a bottom surface including a forward, downwardly and rearwardly beveled surface 314 and a rear downwardly and forwardly beveled surface 316. The angle of inclination of each of the beveled surfaces 314, 316 relative the planar top surface 312 may be, e.g., 17.0°. The central body portion 310 has a central slot 318 extending vertically therethrough which may comprise a dimension measured longitudinally of the actuator means of 0.25 inches and which may comprise a slot length extending transversely of the actuator means of 0.68 inches. Slot 318 defines a forward wall surface 320 and a rear wall surface 321 which are adapted to alternately engage the receiving means post portion 162 for producing relative deflecting movement of the latch member, as described in further detail below. The latch member comprises a forward catch portion 322 and a rear catch portion 324 which may be integrally formed with the central body portion 310. The forward latch portion 322 comprises a forward latching surface 326 which extends generally perpendicularly to top surface 312, FIG. 12. The forward latch portion 322 also comprises a forward beveled surface 328 which may extend at approximately 45° to top surface 312. The rear latch portion 324 may comprise a rear latching surface 330 and a rear beveled surface 332 which may be of generally identical size and shape and positioned in mirror-image relationship with the forward latching surface 326 and forward beveled surface 328. The forward latch portion 322 and the rear latch portion 324 may each project downwardly from the central body portion a distance of, e.g, 0.080 inches from an associated connected portion of the central body beveled surface 314 or 316. The overall length of the latch member measured longitudinally of the actuator means may be 1.13 inches, the maximum thickness of the central body portion may be 0.24 inches, the distance between the forward and rear latching surface 326 and 330 may be, e.g., 0.76 inches, and the lateral dimension of the latch member may be, e.g., 1.02 inches. The latching member may be constructed from acetel, which is commercially available under the trade name Delrin.

Biasing member 292 is illustrated in FIGS. 4 and 12-15. The biasing member 292 may have a laterally dimension approximately equal to that of the latching member 290 and may comprise a central body portion 340 which may have a longitudinal dimension of 0.85 inches, a forward wing portion 342 and a rear wing portion 344 which each extend downwardly and outwardly from the central body portion at an angle of approximately 40°. Each of the wing portions may have a longitudinally and upwardly extending dimension of 0.32 inches. The biasing means also comprises front and rear flange portions 346, 348 extending downwardly and outwardly from associated wing portions 342, 344. The front and rear flange portions may each be inclined at approximately 90° from the associated wing portion and may each comprise a longitudinally and downwardly extending dimension of approximately 0.080 inches. Central body portion 340 may have a centrally positioned bore 350 extending therethrough which is adapted to receive actuator post member 304 therethrough. The captured fit of the latch member and biasing member within the actuator means recess 284 causes the biasing member 292 to be urged against the annular terminal end surface 303 of the actuator stud member 302.

As illustrated in FIG. 12, when the latching member 290 and biasing member 292 are assembled within the recess 284 of the actuator means, the latch means forward and rear beveled surface 328, 332 are urged downwardly against the tapered inner surfaces 294, 296 of the actuator flange portions 286, 288. The flange surfaces 294, 296 slope in a direction generally parallel to the slope of the latch member forward and rear beveled surfaces 328, 332, respectively, enabling relative shifting, pivotal movement of the latching member 290. FIG. 12 illustrates the position which the latch member 290 occupies when no external force is exerted thereon. As illustrated in FIG. 13, when the actuator is moved relative forwardly from the position illustrated in FIG. 12, the latch member forward portion 322 rides up and over the beveled rear surface 227 of the forward raised portion 224, causing the forward latch portion 322 to be relatively elevated and the rear latch portion 324 to be moved relatively downwardly. As illustrated in FIG. 14, as forward pressure applied to the actuator causes continued forward 33 movement of the latch assembly, the latch forward portion, after passing the forward latching surface 226, moves downwardly to a position where the latch bottom surface 314 is located in abutting relationship with the top surface of raised portion 224 and the forward latching surface 326 is located adjacent catch surface 226. In the latch position shown in FIG. 14, relative rearward pressure applied to the receiving means 40 causes post portion 162 thereof to engage the latch slot rear surface 322, producing relative counterclockwise rotation of the latch member which tends to urge the forward latch portion 322 downwardly to maintain latching engagement with surface 226. As further illustrated in FIG. 15, if the actuator 50, rather than the receiving means 40, is urged rearwardly 35, the receiving means post member 162 is urged against the latch member slot forward wall surface 320 causing the latch to be pivotally displaced and elevating the forward latch portion 322, enabling it to pass over forward catch surface 226. As illustrated in FIG. 16, the same general sequence of event occurs in reverse when the rear latch portion 324 encounters the rear raised portion 228. The beveled surface 332 rides up and over beveled surface 232 as the latch moves rearwardly, enabling the rear latching portion 324 to move into the latched position illustrated in solid lines in FIG. 16. When forward 33 force is applied to the receiving means, the receiving means post portion 162 engages the forward wall 320 of the latch means slot and urges the rear latching portion 324 downwardly. However, when forward pressure is released upon the receiving means 40 and forward pressure is applied instead to the actuator means 50, the receiving means post 162 is urged against the rear wall 322 of the latch slot and the latch member is caused to pivot counterclockwise, urging the rear latch portion 324 upwardly and the forward latch portion 322 downwardly to the position illustrated in phantom, thus causing the latch means to be placed in disengaged relationship with the catch means and enabling relative forward movement of the actuator means 50 and receiving means 40.

Operation

The optical disk cartridge receiving apparatus 10 has a first operating position, FIGS. 1 and 17, for receiving an optical disk from a human operator. In this first operating position, the receiving means 40 is positioned with post members 162 and 196 thereof in the forward-most positions within their respective grooves 200, 201 in the housing means 30, FIG. 17. In this position, the forward end portion 42 of the receiving means is positioned in flush relationship with the front surface 138 of the housing means front member 106 and the longitudinal axis BB of the receiving means is positioned parallel to the longitudinal axis AA of the housing means 30. When the cartridge inserted by the operator, FIG. 2, is fully inserted into the receiving means 30, a forward portion of the cartridge 12, e.g. 0.87 inches, projects outwardly from the forward surface 32 of the housing means.

Next, as illustrated in FIG. 18, further rearward hand-pressure exerted against the cartridge 12 by the operator causes the cartridge and the cartridge receiving means to move rearwardly until the latch means 80 forward latching surface 326 engages forward catch surface 226. In this position, the receiving means longitudinal axis remains in parallel alignment with the housing means longitudinal axis, and the forward end 16 of the cartridge is positioned in flush relationship with the forward end 32 of the housing means. The engagement of catch surface 226 by the latch means 80 provides a stopping force which alerts the operator to the fact that hand-insertion of the cartridge is completed.

Figure 19:
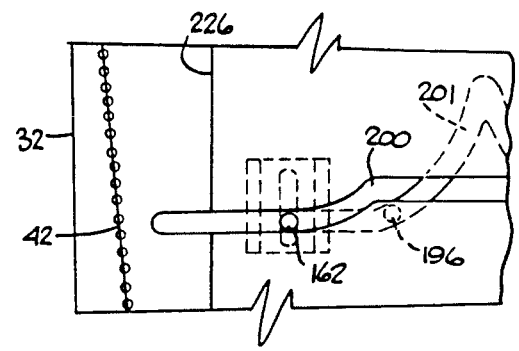

Next, a portion 282 of a mechanized handling apparatus 18 engages a forward surface 278 of actuator nub 276 and begins to move the actuator means 50 rearwardly. The relative movement of the actuator means 50 relative the receiving means 40 causes the latch means 80 to be moved from the latching position illustrated in FIG. 14 to the unlatched position illustrated in FIG. 15. Thereafter, further rearward displacement of the actuator means causes the receiving means post portions 162 and 196 to be moved rearwardly in their respective paths 200, 201. As post means 196 enters the arcuate portion of path 201, the receiving means and cartridge received therein begins to rotate, as illustrated in FIG. 19.

Figure 20:
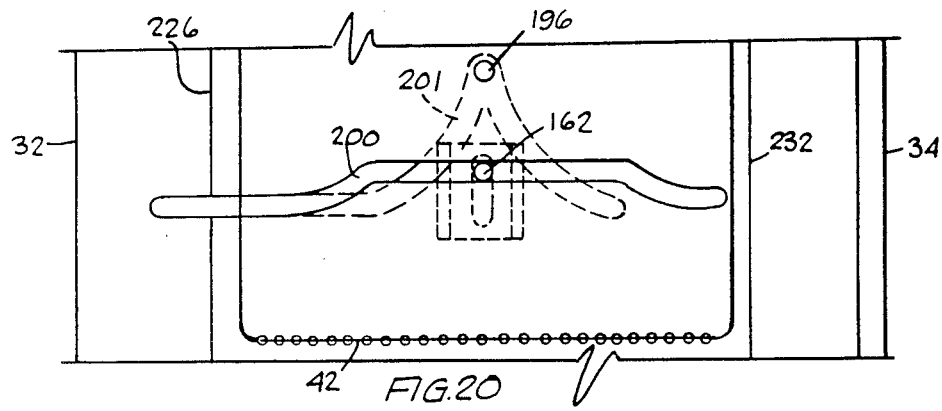
Figure 21:
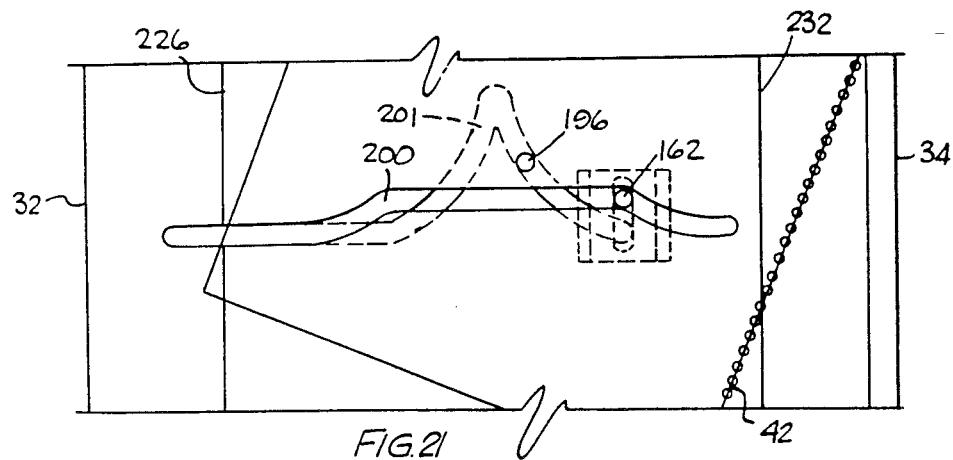

Further rearward displacement of the actuator means 50 causes the receiving means and cartridge 12 to be further rotated in a counterclockwise direction, as illustrated in FIGS. 20 and 21. Finally, as illustrated in FIG. 22, further rearward displacement of the actuator means causes the receiving means and cartridge received to reach their furthest rearward position within their respective housing grooves 200, 201. At this point, the cartridge has been rotated a full 180° from its original insertion orientation.

As also illustrated in FIG. 22 and in solid lines in FIG. 16, when the cartridge receiving means is in its most rearward position, the rear latching surface 330 is positioned so as to be engaged with the rear catch surface 232. So long as no forwardly-directed force is applied to the actuator means, the latch means remains in the latched position shown in solid lines in FIG. 16. In this position, the forward end 16 of the cartridge 12 is positioned in flush relationship with the bottom rear edge surface 131 of the lower housing member 104. The recess provided in the upper housing rear wall 116 immediately above the housing rear opening 138 and the corner recesses 120, 118 provided in the housing upper portion enables the mechanized cartridge handling apparatus 18 to be urged into engagement with the rear end portion 16 of cartridge 12 for engaging the cartridge The latching engagement cf the latch means 80 with the rear catch surface 230 prevents the cartridge 12 from being moved forwardly during this engagement with the mechanized handling device 18. After the handling device 18 engages the cartridge 12, it is moved rearwardly until the cartridge 12 is fully removed from the insertion apparatus 10. Thereafter, the handling device 18 is moved longitudinally and/or laterally to position the cartridge in alignment with a storage location 20 or reading device 15. Thereafter, the handling device 18 moves forwardly to insert the cartridge into the selected storage location or reading device.

In order to return the receiving means 40 to a position for receiving the next hand-inserted cartridge, the cartridge handling device 18 is moved to a position whereat portion 282 thereof is in engagement with the rear surface 280 of actuator nub 276. The mechanized cartridge handling device 18 is then moved forwardly, causing the latch means 80 to be moved from the position illustrated in solid lines to the position illustrated in phantom lines in FIG. 16, producing disengagement of the latch means with rear latch surface 230. Thereafter forward movement of the actuator means 50 causes the receiving means to rotate back through the positions illustrated in FIGS. 21, 20, 19 and 18 until finally returning to the full forward position illustrate in FIG. 17, where it is again ready to receive a hand-inserted cartridge 12. It will also be appreciated that this same return sequence of operations may be used for removing a cartridge 12 from the optical disk storage and handling system 11, in which case the handling device 18 inserts a cartridge into the receiving means when it is in its rearwardmost position prior to urging the actuator means 50 forwardly.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An optical disk cartridge insertion apparatus for an optical disk storage and handling system for use in association with an optical disk cartridge of the type having a rear end portion which is adapted to be inserted into an optical disk reading device and having a forward end portion which is adapted to be grasped by a human operator for handling the cartridge comprising:
   a) housing means for supporting an optical disk cartridge receiving means having a forward end portion and a rear end portion and having a housing longitudinal axis extending therebetween, said housing means having a forward opening for enabling hand-insertion and hand-removal of cartridges by a human operator and having a rear opening for enabling machine-insertion and machine-removal of mechanized cartridges by a cartridge handling apparatus;
   b) cartridge receiving means, supported by said housing means in angularly displaceable relationship with said housing means, for receiving a cartridge therein and for holding said cartridge in stationary relationship therewith, said receiving means having a central longitudinal axis and having forward and rear end portions which are adapted to be positioned in corresponding adjacent relationship with the forward and rear end portions of a cartridge received therein; said receiving means having a forward end opening adapted to enable longitudinal insertion and removal of cartridges from said receiving means; said receiving means comprising a first operating position associated with hand-insertion and hand-removal of cartridges, wherein said forward end portion of said receiving means is positioned proximal said forward end portion of said housing means; said receiving means having a second operating position associated with machine-insertion and machine-removal of cartridges, wherein said forward end portion of said receiving means is positioned proximal said rear end portion of said housing means;

c) actuator means operably connected to said cartridge receiving means for moving said cartridge receiving means between said first operating position and said second operating position thereof;

d) track means having a forward end portion and a rear end portion fixedly associated with said housing means and operably associated with said cartridge receiving means for guiding movement of said receiving means relative said housing means; and e) actuator guide means for limiting the movement of said actuator means relative to said housing means to a forwardly and rearwardly extending actuator path extending parallel to said housing means longitudinal axis.

2. The invention of claim 1 wherein said receiving means comprises a third operating position associated with mechanical feedback to a human operator for notifying the operator that hand-insertion of a cartridge is completed, wherein said front end portion of said receiving means is positioned proximal said front end portion of said housing means; said third operating position of said receiving means being rearwardly displaced relative said housing means central longitudinal axis from said first operating position.

3. The invention of claim 2 further comprising latching means operatively associated with said actuator means and said track means for preventing relative movement between said housing means and said receiving means for releasably maintaining said receiving means in at least one of said second and third operating positions.

4. The invention of claim 1 wherein said receiving means comprises:
first follower means for following said track means; and
second follower means for following said track means.

5. The invention of claim 4 wherein said track means comprises:
first path means for guiding said first follower means; and
second path means for guiding said second follower means.

6. The invention of claim 2 wherein said receiving means comprises oppositely positioned, first and second lateral side portions which are displaced from one another relative a receiving means first lateral axis and wherein said first follower means is attached to said receiving means first lateral side portion, and said second follower means is attached to said receiving means second lateral side portion.

7. The invention of claim 6, said first and second follower means being relatively displaced from one another in a direction perpendicular to said receiving means first lateral axis.

8. The invention of claim 7 wherein said first and second follower means are relatively longitudinally displaced from one another.

9. The invention of claim 8 wherein said first path means comprises:
a first, linear path portion associated with said receiving means first operating position;
a second, arcuate path portion connected with said first path portion;
a third, linear path portion extending parallel to said housing means central longitudinal axis and connected with said second path portion;
a fourth, arcuate path portion connected with said third path portion; and
a fifth, linear path portion connected with said fourth path portion and associated with said receiving means second operating position.

10. The invention of claim 9 wherein said second path means comprises:
a first, linear path portion extending parallel to said housing means central longitudinal axis and associated with said receiving means first operating position;
a second, arcuate path portion connected with said first path portion of said second path means; and
a third, arcuate path portion associated with said receiving means second operating position and connected with said second path portion of said second path means and forming a generally V-shaped configuration therewith.

11. The invention of claim 1 comprising latching assembly means for providing at least one receiving means latching location along said track means.

12. The invention of claim 11, said latching assembly means comprising:
first catch means fixedly located with respect to said track means for coacting with a first latch means;
first latch means mounted on said actuator means for coacting with said first catch means for terminating rearward movement of said receiving means relative said housing means;
the location of said receiving means during engagement of said first latch means with said first catch means defining a receiving means first latching location.

13. The invention of claim 12 wherein said first latch means comprises:
a latching operating position adapted to provide engagement of said first latch means with said first catch means for preventing rearward movement of said receiving means relative said housing means; and
a releasing operating position adapted to release said first latch means from engagement with said first catch means for enabling relative rearward movement of said receiving means beyond said receiving means first latching location.

14. The invention of claim 13, said first latch means being normally biasingly positioned in said latching operating position.

15. The invention of claim 14, said first latch means being positionable in said releasing operating position through application of force to said actuator means in a rearward direction relative said housing means.

16. The invention of claim 15, said latching means comprising:
   second catch means fixedly located with respect to said track means for coacting with a second latch means;
   second latch means mounted on said actuator means for coacting with said second catch means for terminating forward movement of said receiving means relative said housing means;
   the position occupied by said receiving means during engagement of said receiving means second latch means with said second catch means defining a receiving means second latching position.

17. The invention of claim 16 wherein said second latch means comprises:
   a latching operating position adapted to provide engagement of said second latch means with said second catch means for preventing forward movement of said receiving means relative said housing means beyond said receiving means second latching location;
   a releasing operating position, adapted to release said second latch means from engagement with said second catch means for enabling relative forward movement of said receiving means beyond said receiving means second latching location;
   said second latch means being positionable in said latching operating position through transmission of force to said receiving means by a cartridge received therein in a forward direction relative said housing means; and
   said second latch means being positionable in said releasing operating position through application of force to said actuator means in a forward direction relative said housing means.

18. The invention of claim 17 wherein said receiving means first latching location is a relatively forwardly positioned location along said track means whereby a person after fully inserting a cartridge into said receiving means and urging said receiving means rearwardly encounters a stopping resistance to further rearward movement of said receiving means at said first latching location, whereby the operator is alerted that the hand-insertion operation is completed and whereby subsequent engagement and application of rearward force to said actuator means by a mechanized cartridge handling device causes relative rearward displacement of said actuator means and said receiving means whereby said receiving means is moved into said second operating position thereof.

19. The invention of claim 18 wherein said receiving means second latching location is a relatively rearwardly positioned location associated with said receiving means second operating position whereby a mechanized cartridge handling device exerting forward force on a cartridge received in said receiving means encounters a stopping resistance to forward motion which enables actuation of a cartridge engaging and disengaging assembly associated therewith and whereby subsequent engagement and application of forward force to said actuator means by said mechanized handling device causes relative forward displacement of said actuator means and said receiving means whereby said receiving means is moved into said first operating position thereof.

20. The invention of claim 13 wherein said latch means comprises:
   a) a pivotally displaceable latch assembly having a forward portion, a rear portion, a top portion, a bottom portion;
   b) a first laterally and downwardly extending latching surface projecting from said bottom portion of said latch assembly;
   c) an actuator post portion attached to said actuator means at a first end thereof and attached to said top portion of said latch assembly at a second end thereof;
   d) a receiving means post portion attached to said receiving means at a first end thereof and engageable with said bottom portion of said latching assembly at a second end thereof, said actuator post portion and said receiving means post portion being constructed and arranged whereby relative forward displacement of said receiving means relative to said actuator means produces pivotal displacement of said latching assembly in a first pivot direction and whereby relative rearward displacement of said receiving means relative said actuator means produces pivotal displacement of said latching assembly in a second pivot direction; and
   e) a first catch surface fixedly associated with said track means and adapted to engage said latch surface for preventing relative displacement between said catch surface and said latch surface in a first longitudinal direction, said latch surface and said catch surface defining a first latching location of said receiving means.

21. The invention of claim 20 said latch assembly having a first pivotal position whereat said latch surface is located in engageable relationship with said catch surface and a second pivotal position whereat said latch surface is located in nonengageable relationship with said catch surface, said latch assembly being deflectable into said second position through relative movement of said actuator means with respect to said receiving means.

22. An optical disk cartridge insertion apparatus for an optical disk storage and handling system for use in association with an optical disk cartridge of the type having a rear end portion which is adapted to be inserted into an optical disk reading device and having a forward end portion which is adapted to be grasped by a human operator for handling the cartridge comprising:
   cartridge receiving means for receiving an optical disk cartridge in a predetermined orientation therewith, said cartridge receiving means being displaceable between a first relatively rotated operating position and a second relatively rotated operating position angularly displaced from said first operating position;
   track means having a first end and a second end operatively associated with said receiving means for guiding the movement of said receiving means; said track means being constructed and arranged whereby longitudinal displacement of said receiving means from said first end of said track means to said second end of said track means produces relative angular displacement of said receiving means from said first relatively rotated operating position to said second relatively rotated operating position.

23. The invention of claim 22 wherein said second operating position is displaced at least 90° from said first operating position.

24. The invention of claim 23 wherein said second operating position is displaced approximately 180° from said first operating position.

25. The invention of claim 22 further comprising:
actuator means connected to said receiving means for moving said receiving means between said first operating position and said second operating position.

26. The invention of claim 25 further comprising actuator guide means fixedly associated with said track means for guiding the movement of said actuator means.

27. The invention of claim 26, said actuator guide means comprising linear guide means for restraining the movement of said actuator means relative said track means to a linear travel path.

28. The invention of claim 25 further comprising a latch assembly comprising:
latch means operatively associated with said actuator means and said receiving means for coacting with a catch means; and
catch means fixedly associated with said track means for providing at least one receiving means latching position along said track means.

29. The invention of claim 28, said catch means comprising:
a first catch surface adapted to coact with said latch means when said receiving means is in said first relatively rotated operating position.

30. The invention of claim 29, said catch means comprising:
a second catch surface adapted to coact with said latch means when said latch means is in said second, relatively rotated operating position.

31. The invention of claim 28 wherein said latch means is rendered engageable with said first catch surface through application of rearwardly directed pressure to said cartridge received in said receiving means.

32. The invention of claim 29 wherein said latch mean is rendered engageable with said first catch surface through application of rearwardly directed pressure to said cartridge received in said receiving means.

33. The invention of claim 32 wherein said latch means is rendered engageable with said second catch surface through application of forwardly directed pressure to said cartridge received in said receiving means.

34. The invention of claim 31 wherein said latch means is rendered disengageable from said first catch surface through application of rearwardly directed force to said actuator means.

35. The invention of claim 33 wherein said latch means is rendered disengageable from said first catch surface through application of rearwardly directed force to said actuator means.

36. The invention of claim 35 wherein said latch means is rendered disengageable from said second catch surface through application of said rearwardly directed force to said actuator means.

37. The invention of claim 25, said track means comprising a first track and a second track, said receiving means comprising a first follower means for following said first path and a second follower means displaced from said first follower means for following said second track.

38. A latching track and track follower assembly for controlling displacement of an object comprising:
a) track means for defining a path of movement of said object;
b) track follower means fixedly associated to said object for following said track means;
c) actuator means operably associated with said track follower means for transferring force to said follower means for causing displacement thereof along said track means;
d) latch means for engaging a catch means having a first portion connected with said follower means and a second portion connected with said actuator means, said latch means being deflectable through relative displacement between said actuator means and said follower means in a direction parallel to said track means;
e) catch means fixedly associated with said track means for providing at least one latching position along said track means;
f) said latch means being rendered engageable with said catch means through application of force to said object in a first force direction;
g) said latch means being rendered disengageable from said catch means through application of force to said actuator means in said first force direction.

* * * * *